Patented Dec. 25, 1951

2,579,479

UNITED STATES PATENT OFFICE 2,579,479

$\Delta^{1,4}$-PREGNADIENE-17a-OL-3-ONES

Carl Djerassi, George Rosenkranz, and Juan Berlin, Mexico City, Mexico, assignors to Syntex S. A., Mexico City, Mexico, a corporation of Mexico No Drawing. Application January 23, 1950, Serial No. 140,154

3 Claims. (Cl. 260—397.4)

The present invention relates to $\Delta^{1,4}$-pregnadiene-17a-ol-3-ones. More particularly the present invention relates to $\Delta^{1,4}$-dien-3-ones of the 17a-hydroxy pregnane series. Compounds of this general character have substantial therapeutic value.

It has been found in accordance with the present invention that these compounds may be obtained by dibrominating the analogous ring A saturated 3-ketoallosteroids to produce the 2,4-dibromo derivative and thereafter dehydrobrominating the 2,4-dibromo derivative with a suitable base, such as collidine.

The present invention is directed in general to $\Delta^{1,4}$-dien-3-ones of the 17a-hydroxy pregnane series whether or not the cyclopentanophenanthrene ring is substituted in rings B, C or D, and whether or not the compound is provided with a hydroxy group at the 21-position, or the aforementioned 21-hydroxy group has been esterified with a lower fatty acid, as for example acetic acid or propionic acid.

The present invention is especially directed to compounds which may be characterized by the following general formula:

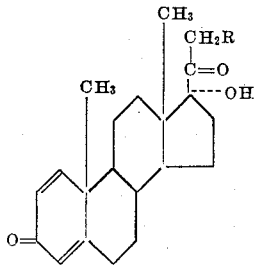

wherein R may be hydrogen or hydroxy or the corresponding esterified compounds with a lower fatty acid, as for example acetic acid, propionic acid, etc.

The following specific examples serve to illustrate the present invention but are not intended to limit the same.

Example I

To a solution of 20 g. of allopregnane-17a-ol-3,20-dione, prepared in accordance with the application of George Rosenkranz, Stephen Kaufmann, and John Pataki, Serial No. 116,624, filed September 19, 1949, in 2 liters of glacial acetic acid was added a few drops of hydrogen bromide in acetic acid solution followed by a solution of 19.3 g. of bromine in 100 cc. of acetic acid. After decolorization, the solution was allowed to stand at room temperature for at least five hours, diluted with water and filtered. The dried precipitate (2,4-dibromoallopregnane-17a-ol-3,20-dione) was purified by recrystallization from ethyl acetate-hexane and was obtained as colorless crystals, with a melting point of 183–185° C. with decomposition), $[a]_D^{20}$ 0° (chloroform. The dehydrobromination was accomplished by refluxing 1.82 g. of the above 2,4-dibromoallopregnane-17a-ol-3,20-dione for one hour with 9 cc. of collidine and partitioning the resulting mixture between chloroform and dilute hydrochloric acid. After thorough washing of the organic layer and drying, the solvent was evaporated and the residue was purified by direct recrystallization or chromatography over activated alumina; the resultant $\Delta^{1,4}$-pregnadien-17a-ol-3,20-dione possessed the following properties: melting point 232–234° C.$[a]_D^{20}$+38.5° (chloroform), ultraviolet absorption maximum at 244 mu.

Example II

A solution of 5 g. of allopregnane-3$\beta$,17a,21-triol-20-one 21-monoacetate (Reichstein substance P esterified with acetic acid in the 21-position) in 1 liter of tertiary butyl alcohol and 10 cc. of pyridine was allowed to stand with 3.6 g. of N-bromoacetamide for 16 hours. The reaction product allopregnane-17a, 21-diol-3,20-dione 21-monoacetate crystallized from the solution and was filtered off. Thereafter it was recrystallized from ethyl alcohol and had a melting point of 245–247° C. This compound was then treated in accordance with the procedure of Example I and the resultant compound was $\Delta^{1,4}$-pregnadien-17a, 21-diol-3,20-dione 21-acetate with a melting point of 217–219° C. $[a]_D^{20}$+88.0° (chloroform).

Example III 10 g. of the allopregnane-17a,21-diol-3,20-dione 21-monoacetate, prepared in accordance with Example II, were dissolved in 3 liters of glacial acetic acid and 3 drops of hydrobromic acid and 4.1 g. of bromine dissolved in 48 cc. of glacial acetic acid were then added. After standing for ten minutes the solution was then poured into water and the precipitate filtered off and washed with water. The dried product was recrystallized from methyl alcohol. 2-bromoallopregnane-17a-21-diol-3,20-dione 21-monoacetate was produced which melted at 200–201° C. (with decomposition).

A solution of 1.4 g. of 2-bromoallopregnane-17a-21-diol-3,20-dione 21-monoacetate was prepared in 200 cc. of glacial acetic acid and 2 drops of hydrogen bromide. To the solution was added 5.8 cc. of a solution of bromine (83 mg./cc.) in acetic acid. After standing eighteen hours at room temperature the product was precipitated by the addition of water and recrystallized from hexane-acetone. The resultant 2,4-dibromo compound had a melting point of 172–176° C. (with decomposition) $[\alpha]_D^{20} +31.0°$ (chloroform). 1.3 g. of the dibromoketone were dehydrobrominated by boiling for one hour with 8 cc. of collidine and the resultant mixture was worked up according to the procedure of Example I. The product $\Delta^{1,4}$-pregnadien-17$\alpha$,21-diol-3,20-dione 21-acetate had a melting point of 217–219° C. $[\alpha]_D^{20} +88.0°$ (chloroform).

It will be obvious to those skilled in the art that various changes may be made without departing from the spirit of the invention and therefore the invention is not limited to what is described in the specification but only as indicated in the appended claims.

We claim:

1. A new compound consisting of a $\Delta^{1,4}$-dien-3-one of the 17$\alpha$-hydroxypregnane series.

2. A new compound consisting of $\Delta^{1,4}$-pregnadien-17$\alpha$-ol-3,20-dione with a melting point of 232–234° C.

3. A new compound consisting of $\Delta^{1,4}$-pregnadien-17$\alpha$,21-diol-3,20-dione 21-acetate with a melting point of 217–219° C.

CARL DJERASSI.
GEORGE ROSENKRANZ.
JUAN BERLIN.

No references cited.